Sept. 7, 1965  J. B. KUCERA  3,204,786
MATERIAL HANDLING APPARATUS
Filed May 13, 1963  4 Sheets-Sheet 1

INVENTOR
JOSEPH B. KUCERA
BY *Rudolph L. Lowell*
ATTORNEY

Sept. 7, 1965 J. B. KUCERA 3,204,786
MATERIAL HANDLING APPARATUS
Filed May 13, 1963 4 Sheets-Sheet 2
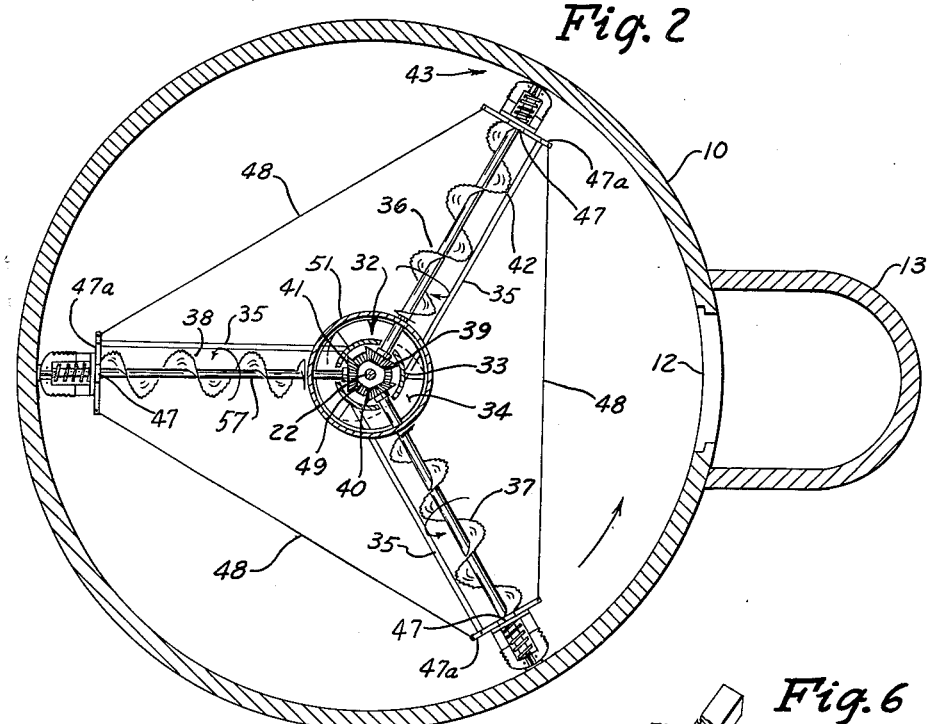
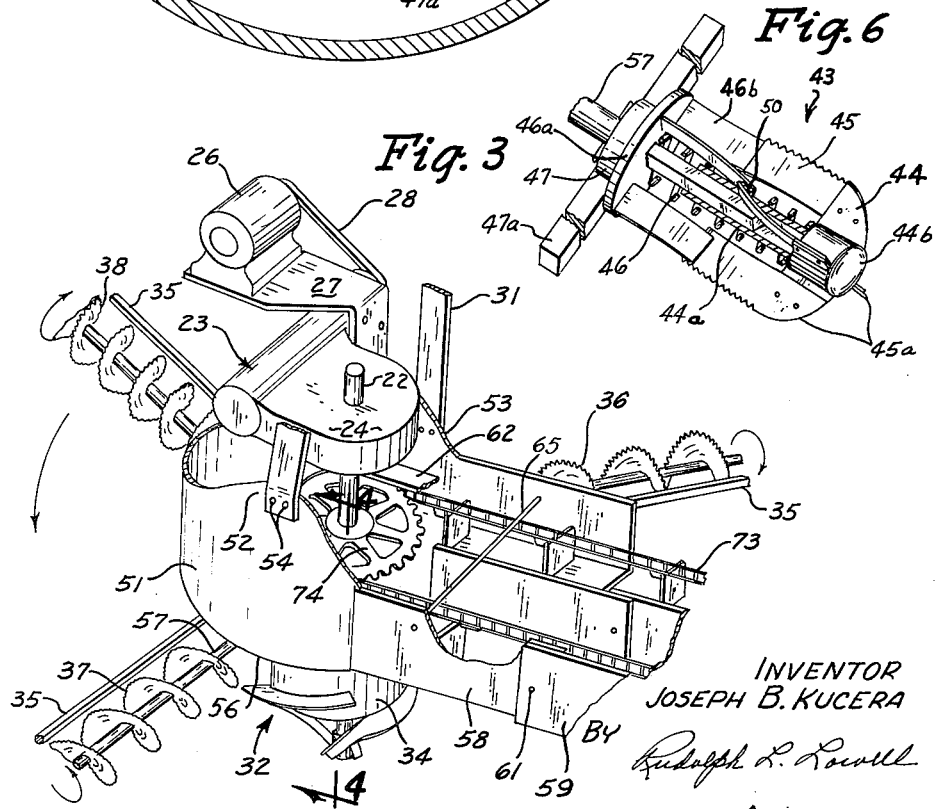
INVENTOR
JOSEPH B. KUCERA
BY Rudolph L. Lowell
ATTORNEY Sept. 7, 1965  J. B. KUCERA  3,204,786
MATERIAL HANDLING APPARATUS
Filed May 13, 1963  4 Sheets-Sheet 3

INVENTOR
JOSEPH B. KUCERA
BY Rudolph L. Lowell
ATTORNEY

Sept. 7, 1965  J. B. KUCERA  3,204,786
MATERIAL HANDLING APPARATUS
Filed May 13, 1963  4 Sheets-Sheet 4
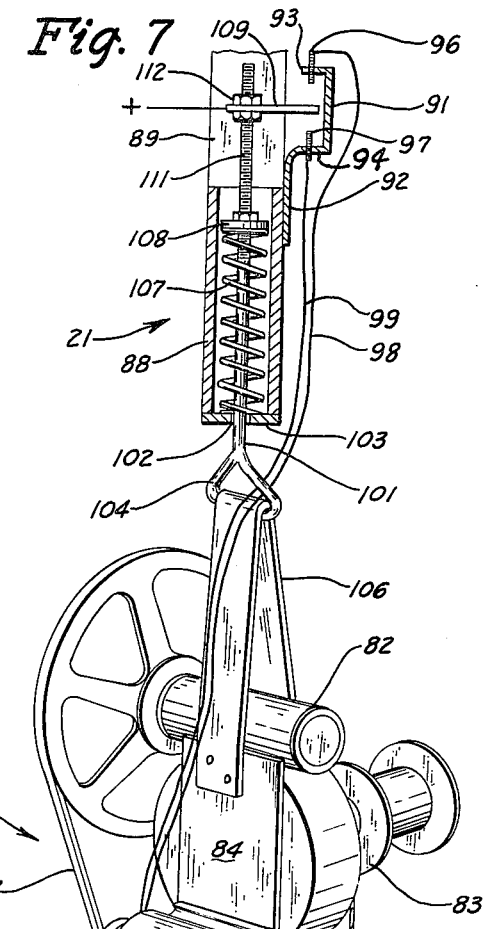
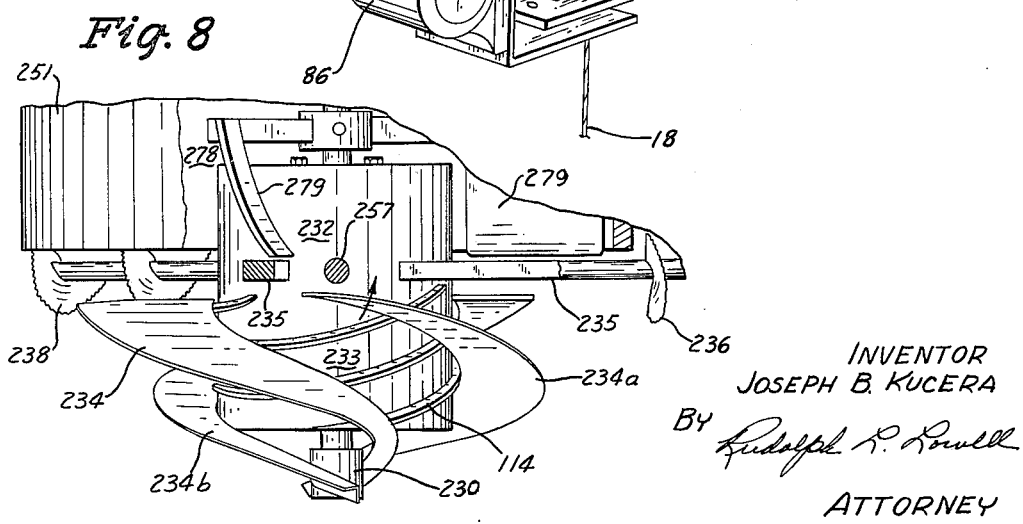
INVENTOR
JOSEPH B. KUCERA
BY
Rudolph L. Lowell
ATTORNEY United States Patent Office 3,204,786
Patented Sept. 7, 1965

3,204,786
MATERIAL HANDLING APPARATUS
Joseph B. Kucera, Traer, Iowa, assignor of fifty percent to Rudolph L. Lowell, Des Moines, Iowa
Filed May 13, 1963, Ser. No. 279,995
6 Claims. (Cl. 214—17)

This invention relates to a material conveying apparatus and more particularly to a silo unloader which operates to remove bulk material stored in a silo.

It is the object of the invetion to provide an improved automatic silo unloader which has a silage collecting means engaging the silage and operative to continuously deliver silage toward the center of the silo and conveying means which carries the silage from the center of the silo to a silage discharge chute.

Another object of the invention is to provide a silo unloader which has low power requirements and is self-cleaning during operation.

A further object of the invention is to provide a silo unloader which can be quickly converted to assist in the loading of forage into a silo by evenly distributing the forage to all parts of the silo.

Still another object of the invention is to provide in combination with a silo unloader, a control means for raising or lowering the silo unloader in accordance with the level of the silage in the silo.

An additional object of the invention is to provide a reliable and economical silo unloader which is sturdy in construction and readily accessible for repair and servicing.

Other objects and advantages of the apparatus embodying the invention will be apparent from the following detailed description taken in conjunction with the drawings in which:

FIG. 2 is an enlarged sectional view taken along the line 2—2 of FIG. 1;

FIG. 3 is an enlarged detail perspective view of the auger and conveying means of the silage unloader of FIG. 1;

FIG. 6 is an enlarged perspective view of a chipper wheel of the unloader of FIG. 1;

FIG. 7 is an enlarged perspective view of the automatic positioning device for the silage unloader; and FIG. 8 is a view similar to FIG. 5 showing a modified form of the auger and conveying means of the invention.

Figure 1:
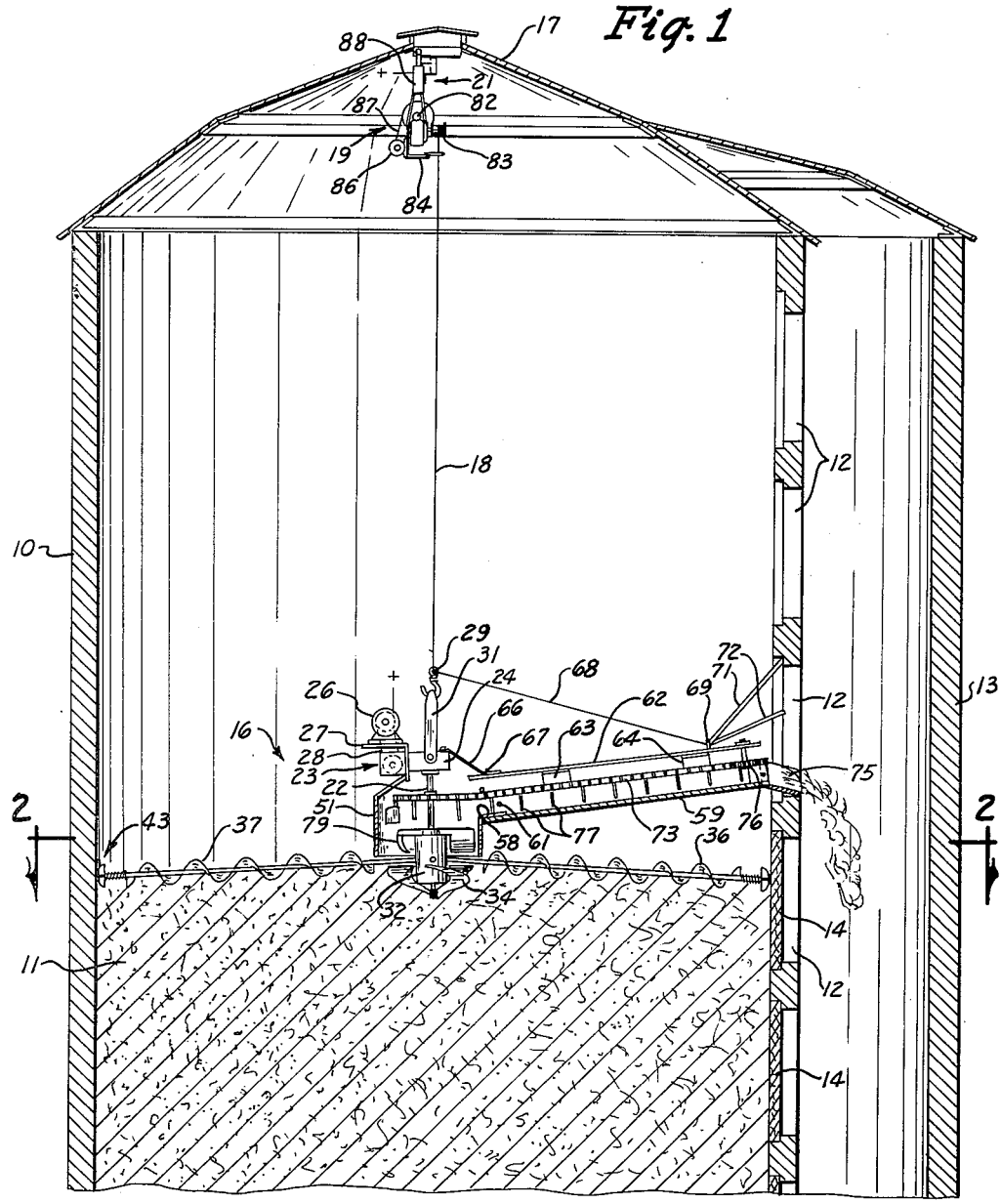
FIG. 1 is a vertical sectional view of a silo showing, in side elevation, the improved silage unloader in operative relation with the silage stored in the silo.

Referring to the drawing, there is shown in FIG. 1 an upright silo 10 partially filled with silage 11 such as cut grasses or corn. The silo 10 has conventional doorways 12 which open up into an upright chute 13. The peripheral wall of the silo 10 is completed by the use of doors 14 which are positioned in the doorway 12. As the level of the silage is lowered the doors 14 are removed from the doorway above the surface of the silage thereby providing an access opening through which the silage may be discharged to the chute 13.

The silage is removed from the silo 10 by an automatic silo unloader 16 which is suspended from the roof 17 of the silo by means of a cable 18 and winch 19. The vertical position of the silo unloader 16 is automatically controlled by the operation of winch 19 and its control switch 21. This operation will be subsequently described in detail.

The silo unloader 16 has an upwardly extending main drive shaft 22. Secured to the upper end of the drive shaft 22 in a driving relation therewith is a power unit 23, such as a worm and worm gear assembly including a housing 24. The drive shaft 22 extends through and is rotatably mounted within the housing 24. Axial movement of the drive shaft 22 relative to the housing 24 is prevented by thrust bearings (not shown). The power unit 23 includes an electric motor 26, mounted on the housing 24 by means of an L-shaped table 27 and drives the worm of the power unit 23 by means of a flexible belt 28.

The lower end of the cable 18 is provided with a hook 29 which extends through an inverted U-shape strap 31 connected at its ends to the housing 24. Thus, the silage unloader 16 is suspended from the roof 17 of the silo 10 by the cable 18.

Figure 4:
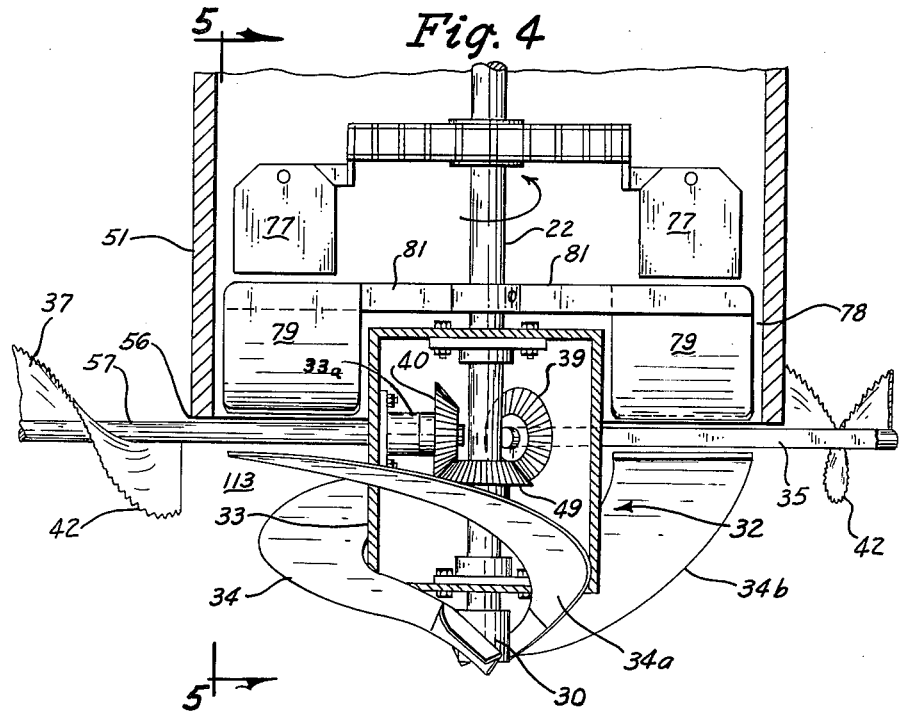
FIG. 4 is an enlarged sectional view taken along the line 4—4 of FIG. 3.

As shown in FIG. 4, the lower end of the drive shaft 22 extends through a power transmission mechanism 32 having a cylindrical shaped housing 33. A plurality of auger flights 34 extend around the cylindrical housing 33 and curve down toward the lower end of the drive shaft 22 and are secured thereto by a collar 30 thereby forming a screw assembly which functions to move silage in an upward direction around the outside of the cylindrical housing 33. The upper surfaces of the auger flights 34 extend circumferentially around the cylindrical housing and slope in an upward direction thereby forming an inclined plane which moves the silage in an upward direction as the auger flights are rotated about the housing 33.

As shown in FIG. 2, three equally spaced silage collecting means illustrated as augers 36, 37 and 38 extend radially from the housing 33. Each auger is stabilized by a beam 35 which extends substantially parallel to the auger adjacent the trailing side thereof. The inner end of the beam 35 is secured to the housing 33 in circumferential alignment with the auger drive shaft 57 and the outer end of the beam is secured to an arm 47a which extends laterally from a bearing 47 positioned about the shaft 57.

The inner end of each auger projects into the housing 33 and is supported therewith by bearings 33a (FIG. 4). Planetary bevel gears 39, 40 and 41 mounted on the inner ends of each auger 36, 37 and 38, respectively, within the housing 33 engage a sun level gear 49 mounted on the drive shaft 22. The horizontal sun bevel gear 49 secured to the drive shaft 22 is in meshing engagement with the teeth on the bottom of the planetary bevel gears 39, 40 and 41 of the respective augers. Rotation of the drive shaft 22 drives the gears 39, 40, 41 and 49 to rotate the respective augers counterclockwise to carry silage to the center of the silo and move or walk the augers counter-clockwise around the silo 10.

The peripheral edges of the flights of the augers 36, 37 and 38 are provided with teeth 42 which function to cut into the silage as the augers are rotated thereby providing a more uniform flow of material toward the center of the silo.

As best illustrated in FIG. 1, the augers extend radially outward from the housing 33 at a downward angle of about two to five degrees thereby leaving the surface of the silage 11 in a cone shape. Mounted on the outer ends of each auger is a chipper wheel 43 which breaks up and loosens silage that may be hard or frozen and adheres to the sides of the silo.

As shown in FIG. 6, the chipper wheel 43 comprises a spider hub 44 having a non-circular axial sleeve 44a telescoped over the outer end of the auger drive shaft 57 to form a driving connection between the auger and chipper wheel. The outward end of the hub 44 is enlarged and defines a hemispherical knob 44b which continuously engages the inside wall of the silo. Mounted on the spider hub 44 and extended radially outward and axially inward therefrom are a plurality of curved cutting knives 45 having arcuate convex cutting edges 45a which curve toward the knob 44b. The curved shape of the knives 45 and the hemispherical knob 44b permit the chipper wheels 43 to be tilted in all directions so that only knob 44b engages the silo wall.

A collar 46a is positioned inwardly of the sleeve 44a and is drivably connected to the auger drive shaft 57. A plurality of radially extended plates 46b are secured to the collar 46a and project in an outward direction. The plates 46b correspond in number to the knives 45 and extend in an overlapping relation therewith. In order to provide for movement of the silage from the silo wall the plates 46b have a spiral curve which is a substantial continuation of the curve of the cutting knives 45.

The chipper wheels 43 are biased radially outward with the knob 44b in continuous engagement with the silo wall by a compression spring 46 concentrically positioned over the sleeve 44a. One end of the spring 46 engages the collar 46a and the opposite end thereof engages the spider 44. In order to prevent the spring 46 from moving the sleeve 44a from the shaft 57, the knives 45 and plates 46b each have coacting stop members 50 which engage each other when the spider 44 and the knives 45 move away from the plates 46b.

As shown in FIG. 2, the bearings 47 on the respective augers 36, 37 and 38 have oppositely extended lateral arms 47a. The arms 47a of adjacent augers are connected by means of a cable 48 which holds the respective augers in circumferentially spaced relationship with respect to each other when the augers move or walk around the silo.

As shown in FIG. 3, a cylindrical housing 51 is concentrically positioned with respect to the drive shaft 22 and has upwardly extended ears 52 and 53 adjacent the worm gear housing 24. Bolts 54 extend through the ears 52 and 53 to secure the housing 51 to the worm gear housing 24. The bottom edge 56 of the housing 51 terminates adjacent the drive shaft 57 for the respective augers. Integrally formed with one side of the housing 51 is a laterally projected spout 58 having a generally U-shape in transverse cross-section and projected toward the doorways 12 of the silo. As best shown in FIG. 1, an elongated conveyer pan 59 is pivotally mounted on the spout 58 by means of a pin 61 and extends from the spout to the doorway 12 of the silo. An elongated beam 62 extends parallel to the conveyer pan 59 and is connected thereto by a pair of downwardly extended braces 63 and 64. The inner end of the beam 62 is pivotally connected to a radial arm 66 extending outwardly from the housing 24. A pin 67 slidably connects the inner end of the beam 62 to the arm 66. The outer end of the beam 62 and conveyer pan 59 is held in an elevated position by a cable 68 which is secured at one end to the hook 29 and at the other end to an upward projected bracket 69 secured to the beam 62. The beam 62 and conveyer pan 59 are held in alignment with the doorway 12 by a pair of arms 71 and 72 which are pivotally mounted on the bracket 69 and project through the doorway engaging the side thereof.

The silage in the center of the silo unloader 16 is moved over the conveyer pan 59 by a chain conveyer 73 which extends around a drive sprocket 74 mounted on the drive shaft 22 below the housing 24 and around an end sprocket 76 which is rotatably mounted on the end of the beam 62. A guide bar 65 mounted on the spout 58 engages the top of the chain conveyer 73 to keep the chain in alignment with the drive sprocket 74. The conveyer has downwardly extending hands 77 which push the silage along the upper surface of the conveyer pan 59 toward the doorway 12 onto a spout 75 hinged to the outer end of the pan 59 and extended in the silo chute 13.

As shown in FIG. 4, the silage is prevented from building up and packing in a throat cavity 78 formed by the housing 51 by means of a plurality of paddles 79 which are secured to the drive shaft 22 by means of inwardly extended arms 81. The paddles 79 extend downwardly adjacent the outer periphery of the housing 33 and terminate slightly above the plane of the drive shafts 57 for the augers 36, 37 and 38 and the beams 35. The paddles 79 slope rearwardly with respect to their direction of rotation so as to plow up or move the silage in the throat area 78 up into the path of movement of the conveyer hands 77 which push the silage toward the doorway 12. As the paddles 79 rotate they move over the beams 35 and shafts 57 cutting the silage that is lodged in a throat cavity 113.

The winch 19 and control switch 21 shown in FIG. 7 comprises a worm gear assembly 82 having a drum 83 adapted to receive the suspension cable 18. An angular plate 84 supports a reversible electric motor 86 and the worm gear assembly 82. The electric motor 86 is coupled in a driving relation with the worm gear assembly 82 by means of a belt 87. The electric motor 86 is connected to a source of electric power by the control switch 21. The motor 86 runs in opposite directions dependent upon the load upon the cable 18.

The control switch 21 comprises a cup-shaped housing 88 which is connected to the roof of the silo by means of a strap 89. A U-shaped bracket 91 having a downwardly extended leg 92 is secured to one side of the housing 88. Each leg 93 and 94 of the U-shaped bracket carries an insulated electrical contact 96 and 97, respectively. Conductors 98 and 99 connect the contacts 96 and 97 to the reversible electric motor 86. A rod 101 extends through a hole 102 in the bottom wall 103 of the housing 88 and projects out of the housing 88 above the top wall thereof. The lower end of the rod 101 is shaped into a loop 104. The strap 106 extends through the loop 104 and is secured to the angle plate 84 and worm gear assembly 82 thereby positively connecting the winch 19 with the control switch 21. A compression spring 107 is positioned within the housing 88 concentrically of the rod 101. A washer 108 threadably secured to the rod 101 engages the top of the spring 107 thereby connecting the rod 101 by means of the spring 107 to the housing 88. A laterally projected conductor element 109 connected to a source of electric power (not shown) is held on the upper threaded end 111 of the rod 101 between a pair of nuts 112. The position of the conductor element 109 with respect to the electrical contacts 96 and 97 may be adjusted by changing the vertical position of the nuts 112. When the conductor element 109 engages the electrical contact 96 the electric motor 86 is connected to the source of electric power thereby operating the winch to increase the length of the suspension cable 18. When the weight on the cable 18 has been increased the spring 107 will be compressed thereby moving the conductor element 109 out of engagement with the electrical contact 96 breaking the electric circuit to the motor 86.

In operation, the silo unloader 16 is positioned in the silo with the conveyer 73 directed toward an open doorway 12. The arms 71 and 72 are moved into engagement with the side of the doorway 12 to maintain the aligned position of the conveyer with the open doorway. The electric motor 26 is connected to a source of electric power by a manual switch (not shown) positioned in the feed room. The motor operates the power unit 23 to rotate the main drive shaft 22. The turning drive shaft 22 rotates the auger flight 34, 34a and 34b secured to the end of the drive shaft by a collar 35 to raise the silage in the center section of the silo up into the throat cavity 78 formed by the housing 51. The rotating auger flights 34, 34a and 34b because of their inclined spiral arrangement tend to dig into the center of the silage in the manner of a screw.

Figure 5:
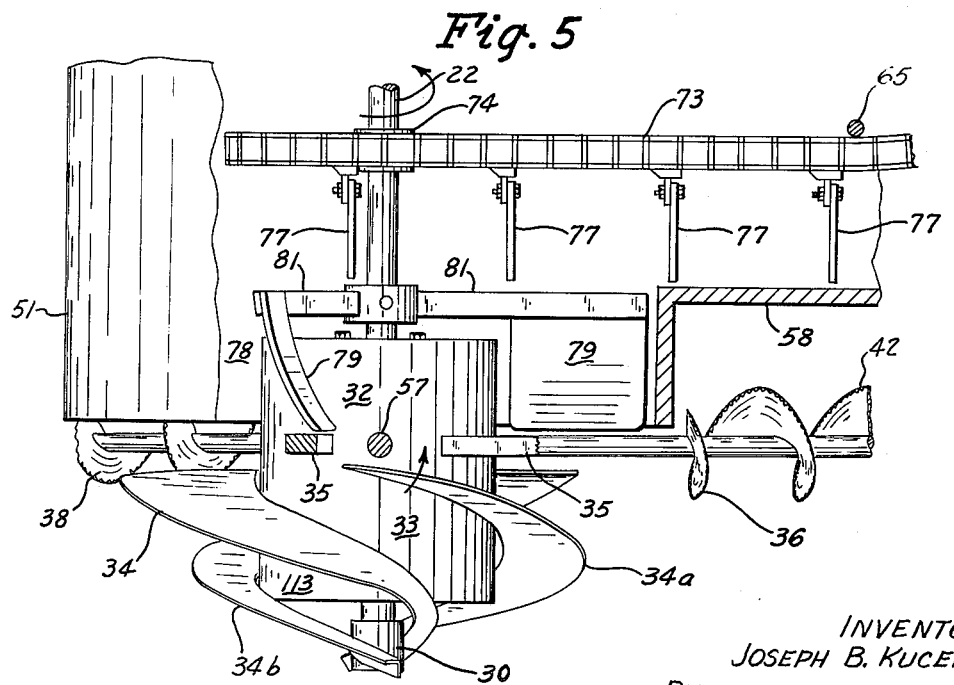
FIG. 5 is a sectional view taken along the line 5—5 of FIG. 4.

As shown in FIGS. 4 and 5, successive flights 34, 34a and 34b overlap each other in a circumferential direction to form the vertical or upright silage receiving cavity 113 between successive flights. The augers 36, 37 and 38 are driven by the turning drive shaft 22 and move the silage toward the center of the silo into the material receiving cavity 113. In other words, the upright auger formed by the flights 34, 34a and 34b is fed from a lateral direction by the radial extended collecting augers 36, 37 and 38. The meshing bevel gears in the transmission 32 rotate the respective drive shafts 57 for the augers and provide a torque on the housing 33 which causes the augers 36, 37 and 38 to move or walk around the silo 10. The speed of the walking movement of the augers depends upon the amount of silage being conveyed by the respective augers toward the center of the silo and the friction drag of the chipper wheels 44 on the side walls. The greater the quantity of material moved by the augers 36, 37 and 38, the slower the circumferential movement thereof around the silo. When these augers are raised out of engagement with the surface of the silage they are moved around the silo in substantially the same speed of rotation as the drive shaft 22. The auger flights 34 which are moved in a circular path carry the silage placed in the cavity 113 up into the throat cavity 78 and into the path of the rotating paddles 79. Under unloading conditions the flights 34 and paddles 79 being in direct driving engagement with the drive shaft 22 rotate at a greater speed than the walking speed of the augers 36, 37 and 38. Thus the inner ends of the auger drive shafts 57 will prevent the silage from packing in the mouth of the throat cavity 78.

As seen in FIG. 5, the sloping paddles 79 move the silage out of the throat cavity 78 into the path of movement of the conveyer hands 77. The moving conveyer 73 carries the silage along the conveyer pan 79 and discharges it out through the open doorway 12 into the silo chute 13.

As the silage 11 is removed from the silo the winch 19 is automatically operated by the control switch 21 to lower the silo unloader 16 thereby keeping the collecting augers 36, 37 and 38 in constant and uniform engagement with the top of the silage. This position is regulated by the compression characteristics of the spring 107 in the control switch 21. As shown in FIG. 7, when the weight on the cable 18 is increased which is caused by removing the silage support from under the silo unloader, the spring 107 will be compressed thereby moving the conductor element 109 into engagement with the electrical contact 97. The winch motor 86 is thereby connected to the source of electric power and operated to turn the worm gear assembly 82 for increasing the length of the cable 18 with the resultant lowering of the silo unloader 16. When the silo unloader rests on the top of the silage 11 in the silo the weight on the cable 18 is reduced thereby enabling the spring 107 to bias the conductor element 109 upward out of engagement with the electrical contact 97 to break the electrical circuit to the motor 86. This on and off operation of the winch 19 is continuous to automatically lower the silo unloader 16. As the level of the silage 11 is lowered the livestock rancher periodically removes the doors 14.

The silo unloading apparatus 16 can be used to evenly distribute the cut forage during the filling of the silo. In the loading or filling of the silo the silo unloader 16 is suspended from the roof 17 by the cable 18 by means of the winch 19 and control switch 21 therefor. The collecting augers 36, 37 and 38 engage a relatively thin top layer of silage so that they move around or walk around the silo at a rate of speed just under the speed of rotation of the drive shaft 22. The respective collecting augers 36, 37 and 38 are rotated about their axes by the torque established by the bevel gear connection in the transmission mechanism 32 and thereby move the sliage toward the center of the silo. This movement is counteracted by the outward centrifugal action of the moving collector augers which tend to throw the silage toward the peripheral walls of the silo.

The position of the silo unloader 16 is automatically maintained by the winch 19 and switch control 21 assembly shown in FIG. 7. When the silo unloader is used to level material placed into the silo the conductor element 109 is adjusted upward on the rod 101 so that when part of the weight of the silo unloader has been removed from the cable 18 the compression spring 107 will move the conductor element 109 into engagement with the electrical contact 96. This connection will connect the winch motor 86 with the source of electrical power so that the motor 86 will be energized operating the winch 19 to shorten the cable 18 thereby raising the silo unloader with a resultant increase in load on the compression spring 107. This increased load will compress the spring 107 and move the conductor element 109 out of engagement with the electrical contact 96 thereby breaking the electrical circuit to the motor 86.

In summary the silo unloader 16 operates in combination with a winch 19 which controls the vertical position of the silo unloader 16 in response to the weight or force applied to the winch. The resultant effect of this operation is an automatic movement of the collecting augers 36, 37 and 38 into engagement with the top of the silage 11 stored in the silo as the level of the silage is lowered. The radially extended collecting augers 36, 37 and 38 move the silage toward the center of the silo into the sides of an upright auger formed by the flights 34, 34a and 34b. This silage is forced upward by the flights 34, 34a and 34b into the path of a moving conveyer which carries the silage to the open doorway of the silo and discharges the silage into the silo chute.

The auger and conveying means shown in FIG. 8 is similar in construction to the structure shown in FIGS. 4 and 5. Identical structure is identified with the same reference number having a prefix of 2. The cylindrical housing 233 has a spiral ribbon 114 secured to the outer peripheral surface. The slope of the ribbon 114 is in a direction opposite the spiral formed by the auger flights 234, 234a, and 234b. As the auger flights 234, 234a, 234b move around the housing 233 the radial augers 236, 238 carry silage into engagement with the housing 233. The spiral ribbon 114 supplements the upward movement of the silage into the path of the paddles 279.

While there have been shown, described, and pointed out the fundamental novel features of the invention as applied to the preferred embodiment, it is to be understood that various omissions, substitutions, changes in form, and details of the apparatus illustrated may be made by those skilled in the art, without departing from the spirit of the invention. It is intended to be limited only as indicated by the scope of the following claims.

I claim:
1. A bulk material handling system for automatically removing bulk material stored in a silo comprising:
    (a) a silo unloader positioned centrally within said silo and operative to remove bulk material stored in the silo and,
    (b) means suspending said unloader centrally within said silo including a winch means and a winch control means, with a portion of the weight of the unloader carried by said winch means and control means and the remaining weight of the unloader supported on the surface of the stored bulk material,
    (c) said control means operable to connect said winch means to a source of power to lower the unloader when the surface of the bulk material is lowered to a position wherein the weight of the unloader carried by the winch means and control means is greater than said portion of the weight of the unloader, and to disconnect said winch means from the source of power when the weight of the unloader carried by the winch means and control means is equal to or less than said portion of the weight of the unloader.

2. The bulk material handling system defined in claim 1 wherein the control means comprises:
    (a) a resilient link means which is compressed when the weight of the unloader carried by the suspension means is greater than said portion of weight of the unloader, and (b) switch means operable to connect the winch means with a source of power when said resilient link means is in compressed condition.

3. The bulk material handling system defined in claim 1 wherein the control means comprises:

(a) resilient link means compressed in response to an increase in the portion of the weight of the unloader carried said suspension means, and (b) switch means for controlling the operation of the winch means in response to said increase in the portion of the weight of the unloader supported by the suspension means, (c) said switch means having a member adjustable relative to the link means whereby the operation of the switch means may be controlled relative to the part of the weight of the unloader which is to be supported by the suspension means.

4. A bulk material handling system for automatically and evenly distributing bulk material to all parts of a silo during loading, comprising:

(a) a silo unloader positioned centrally within said silo and operative to distribute bulk material on filling of the silo, and (b) means suspending said unloader centrally within said silo including a winch means and a winch control means, with a portion of the weight of the unloader carried by said winch means and control means and the remaining weight of the unloader supported on the surface of the stored bulk material, (c) said control means operable to connect said winch means to a source of power to raise the unloader when the surface of the bulk material is raised to a position wherein the weight of the unloader carried by the winch means and control means is less than said portion of the weight of the unloader, and to disconnect said winch means from the source of power when the weight of the unloader carried by the winch means and control means is equal to or greater than said portion of the weight of the unloader.

5. The bulk material handling system defined in claim 4 wherein the control means comprises:

(a) a resilient link means which is elongated when the weight of the unloader carried by the suspension means is less than said portion of the weight of the unloader, and (b) switch means operable to connect the winch means with a source of power when said resilient link means is in an elongated condition.

6. In combination, (a) a bulk material handling apparatus adapted to remove bulk material stored in a silo and to distribute bulk material during loading of the silo, (b) means suspending said apparatus centrally within said silo including a winch means and a winch control means, with a portion of the weight of the apparatus carried by said suspension means and the remaining weight of the apparatus supported on the surface of the stored bulk material, (c) said control means operable during material removal to connect said winch means to a source of power to lower the apparatus when the surface of the bulk material is lowered to a position wherein the weight of the apparatus carried by the suspension means is greater than said portion of the weight of the apparatus, and (d) said control means operable during bulk material loading to connect said winch means to a source of power to raise the apparatus when the surface of the bulk material is raised to a position wherein the weight of the apparatus carried by the bulk material is greater than said portion of the weight of the apparatus.

References Cited by the Examiner
UNITED STATES PATENTS

| | | | |
|---|---|---|---|
| 894,618 | 7/08 | Ferguson | 214—17 |
| 1,926,119 | 9/33 | Smith. | |
| 2,309,418 | 1/43 | Schweickart et al. | 198—213 |
| 2,381,505 | 8/45 | Lindholm | 214—17.62 |
| 2,430,203 | 11/47 | Bailey | 214—17.84 |
| 2,663,594 | 12/53 | Dennick | 214—17.84 X |
| 2,858,033 | 10/58 | Hofer | 214—17 |
| 2,988,238 | 6/61 | Bruecker | 214—17 |
| 3,035,719 | 5/62 | McLean | 214—17 |
| 3,104,766 | 9/63 | Sasadi | 214—14 |

HUGO O. SCHULZ, *Primary Examiner.*

GERALD M. FORLENZA, *Examiner.*